United States Patent
Chen et al.

(10) Patent No.: US 9,261,646 B2
(45) Date of Patent: Feb. 16, 2016

(54) OPTICAL FIBER WITH LARGE EFFECTIVE AREA

(71) Applicant: YANGTZE OPTICAL FIBRE AND CABLE JOINT STOCK LIMITED COMPANY, Wuhan, Hubei (CN)

(72) Inventors: Su Chen, Hubei (CN); Chen Yang, Hubei (CN); Beibei Cao, Hubei (CN); Weijun Tong, Hubei (CN); Jie Luo, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 14/439,480

(22) PCT Filed: Jul. 3, 2013

(86) PCT No.: PCT/CN2013/078721
§ 371 (c)(1),
(2) Date: Apr. 29, 2015

(87) PCT Pub. No.: WO2014/067291
PCT Pub. Date: May 8, 2014

(65) Prior Publication Data
US 2015/0301277 A1    Oct. 22, 2015

(30) Foreign Application Priority Data
Oct. 30, 2012    (CN) .......................... 2012 1 0423490

(51) Int. Cl.
*G02B 6/036* (2006.01)
*G02B 6/028* (2006.01)
*G02B 6/02* (2006.01)

(52) U.S. Cl.
CPC ............ *G02B 6/036* (2013.01); *G02B 6/02009* (2013.01); *G02B 6/02019* (2013.01);
(Continued)

(58) Field of Classification Search
CPC ............... G02B 6/0288; G02B 6/0365; G02B 6/02019; G02B 6/0281; G02B 6/03666; G02B 6/03661; G02B 6/03616; G02B 6/03688; G02B 6/03605; C03B 37/01211
USPC ............. 385/123, 127, 124, 128, 126; 65/439
See application file for complete search history.

(56) References Cited

U.S. PATENT DOCUMENTS

| 6,169,837 B1 * | 1/2001 | Kato ................. G02B 6/02009 385/123 |
| 6,181,858 B1 * | 1/2001 | Kato ................. G02B 6/02014 385/123 |

(Continued)

FOREIGN PATENT DOCUMENTS

| CN | 101363941 A | 2/2009 |
| CN | 101446663 A | 6/2009 |

(Continued)

OTHER PUBLICATIONS

International Search Report issued by State Intellectual Property Office of the P. R. China dated Oct. 10, 2013 for Application No. PTC/CN2013/078721.

*Primary Examiner* — Akm Enayet Ullah
(74) *Attorney, Agent, or Firm* — Tim Tingkang Xia, Esq.; Locke Lord LLP

(57) ABSTRACT

An optical fiber with a large effective area includes a core layer and a cladding layer. The core layer comprises an inner core layer having a radius of 1-4 μm and a relative refractive index difference $\Delta_{12}$ of $-0.2\% \geq \Delta_{12} < 0\%$ relative to the outer core layer, and an outer core layer having a radius of 4-7 μm and a relative refractive index difference $\Delta_2$ of $-0.15\%$-$0.05\%$. $\Delta_{12}$ remains unchanged or increases as the radius of the inner core layer increases. The cladding layer comprises an inner cladding layer cladding the core layer and having a radius of 7-20 μm and a relative refractive index difference $\Delta_3$ of $-0.5\%$~$-0.1\%$, a depressed cladding layer has a radius of 12-40 μm, and a relative refractive index difference $\Delta_4$ of $-1.0\%$~$-0.3\%$, and an outer cladding layer having a relative refractive index difference $\Delta_5$ of $-0.2\%$~$-0.4\%$.

18 Claims, 4 Drawing Sheets

(52) U.S. Cl.
CPC ............ *G02B6/0281* (2013.01); *G02B 6/0288* (2013.01); *G02B 6/0365* (2013.01); *G02B 6/03661* (2013.01); *G02B 6/03688* (2013.01)

(56) References Cited

U.S. PATENT DOCUMENTS

| | | | | |
|---|---|---|---|---|
| 6,301,419 | B1 * | 10/2001 | Tsukitani | G02B 6/02009 385/123 |
| 6,337,942 | B1 * | 1/2002 | Kato | G02B 6/02014 385/126 |
| 6,535,677 | B1 * | 3/2003 | Tanaka | C03B 37/0253 385/123 |
| 7,024,083 | B2 * | 4/2006 | Bickham | G02B 6/02014 385/123 |
| 7,103,251 | B2 * | 9/2006 | Bickham | G02B 6/02009 385/127 |
| 7,120,340 | B2 * | 10/2006 | Berkey | C03B 37/01217 359/333 |
| 7,889,960 | B2 * | 2/2011 | de Montmorillon | G02B 6/0365 385/127 |
| 8,280,213 | B2 * | 10/2012 | Molin | G02B 6/0365 385/123 |
| 8,644,664 | B2 * | 2/2014 | Molin | G02B 6/0281 385/124 |
| 8,798,423 | B2 * | 8/2014 | Sillard | G02B 6/03666 385/127 |
| 8,798,424 | B2 * | 8/2014 | Bigot-Astruc | G02B 6/03666 385/123 |
| 8,867,879 | B2 * | 10/2014 | Bigot-Astruc | G02B 6/02019 385/123 |
| 9,014,525 | B2 * | 4/2015 | Molin | G02B 6/0365 385/127 |
| 2002/0106172 | A1 * | 8/2002 | Kato | G02B 6/02014 385/127 |
| 2005/0063654 | A1 | 3/2005 | Oh et al. | |
| 2010/0189400 | A1 * | 7/2010 | Sillard | G02B 6/02019 385/127 |
| 2011/0217012 | A1 * | 9/2011 | Bigot-Astruc | G02B 6/0288 385/127 |

FOREIGN PATENT DOCUMENTS

| | | |
|---|---|---|
| CN | 101625438 A | 1/2010 |
| CN | 102200610 A | 9/2011 |

* cited by examiner

OPTICAL FIBER WITH LARGE EFFECTIVE AREA

FIELD OF THE INVENTION

The present invention relates to optical fiber, and particularly to a single-mode optical fiber with a large effective area and low attenuation.

BACKGROUND OF THE INVENTION

With the development of international communication services, especially the rapid development of internet technology, 3G technology, and passive optical network technology, the demand of the communication systems on the bandwidth of optical fiber is becoming increasingly high. In the communication systems of long distance, large capacity, and high speed transmission, the optical fiber amplifier technology and wavelength division multiplexing technology are generally used. Especially in backbone networks and undersea communication networks, the requirement for the transmission distance without relay and transmission capacity of the optical fiber is much higher. However, with the increasing of transmission capacity and transmission distance, a higher input power and a lower attenuation of the optical fiber are needed to meet the requirement of distinguishable signal-to-noise ratio. With the increasing of the input power of the optical fiber, the self-phase modulation, cross-phase modulation, four-wave mixing, and other nonlinear effects, especially the stimulated Brillouin scattering effect which has a relatively low threshold, would occur inevitably in the narrow core layer of the optical fiber. The occurrence of these effects would result in crosstalk phenomenon in the system, or reduce the signal-to-noise ratio of the system. In this case, the transmission capacity of the communication system cannot be improved any further.

The occurrence of these nonlinear effects is particularly related to the optical power density of the optical fiber. In general, if the effective area of the optical fiber is improved, the power density of the optical fiber can be reduced. In this manner, the thresholds of the nonlinear effects of the optical fiber can be reduced, and the transmission power thereof can be improved accordingly. However, with the increasing of the effective area, the value of MAC of the optical fiber will increase accordingly, and the optical fiber will become more sensitive to the bending thereof. In practical use, the additional attenuation generated by the bending of the optical fiber would increase the total attenuation of the optical fiber, and thus the transmission performance thereof would be affected. In addition, if the attenuation of the optical fiber can be reduced, the signal with the same input power can be transmitted farther in the optical fiber, and thus the transmission capacity thereof can be improved.

In the G.654 standard revised in 2010 by the International Telecommunication Union Telecommunication Standardization Sector (ITU-T), a cutoff wavelength shifted single-mode optical fiber is defined. The attenuation value of this kind of optical fiber is less than 0.22 dB/km, and the mode field diameter thereof at a wavelength of 1550 nm ranges from 9.5 μm to 13 μm. Compared with Standard Single-Mode Fiber (SSMF), the mode field diameter of the above cutoff wavelength shifted single-mode optical fiber is 1 μm to 2 μm higher. Therefore, the aforesaid cutoff wavelength shifted single-mode optical fiber has a relatively large effective area. When a cable made of said optical fiber is used undersea, the span distance without relay thereof can be improved effectively. However, its macro-bending performance is inferior to SSMF apparently.

An optical fiber is proposed by U.S. Pat. No. 6,904,218. Said optical fiber comprises a central core, an intermediate depressed cladding layer, and an outer cladding layer. The effective area of the optical fiber is larger than 80 μm$^2$ at a wavelength of 1310 nm; the macro-bending attenuation thereof with a bending radius of 10 mm is less than 0.7 dB/turn; and the attenuation value thereof is less than 0.19 dB/km. However, in all of the embodiments of U.S. Pat. No. 6,904,218, the effective area of the optical fiber is 131.2 μm$^2$ at most at a wavelength of 1550 nm.

Another kind of optical fiber is proposed by U.S. Pat. No. 7,254,305. Said optical fiber comprises a central core, an intermediate cladding layer, a depressed cladding layer, and an outer cladding layer. The attenuation value of the optical fiber is less than 0.19 dB/km at a wavelength of 1550 nm. However, the refractive index of the central core is far different from that of the cladding layer, which renders that an effective area larger than 100 μm$^2$ cannot be obtained. Meanwhile, since the absolute value of the refractive index of the central core is relatively high, a high germanium-doping concentration is needed, and thus the attenuation value of the optical fiber is higher than 0.185 dB/km.

In general, the effective area of the optical fiber can be improved through the following two methods. On the one hand, the effective area of the optical fiber can be improved through increasing the geometric dimension of the core layer. The refractive index of the core layer is higher than that of the cladding layer, and most of light transmits in the core layer of the optical fiber. Hence, the effective area of the optical fiber can be improved directly through increasing the diameter of the core layer. However, the increasing of the diameter of the core layer will affect the cutoff wavelength of the optical fiber directly, while the cutoff wavelength must be less than the window wavelength of the communication. Therefore, the increasing extent of the core layer diameter is limited. On the other hand, the effective area of the optical fiber can be improved through reducing the relative refractive index of the core layer. In this manner, the optical field can be distributed flatter, the effective area can be increased, and the cutoff wavelength can be reduced. However, in this case, the attenuation of the optical fiber would be adversely affected.

Although the effective area of the optical fiber can be improved through changing the structure of the core layer and increasing the size of the core layer, the bending performance and the attenuation performance of the optical fiber would be adversely affected. Taking the bending performance of the optical fiber into consideration, the increasing of the effective area of the optical fiber in the above patents is limited. At present, an optical fiber with an effective area larger than 135 μm$^2$ and good bending performance is not reported yet by any patent.

SUMMARY OF THE INVENTION

The related terms are defined and explained as follows in order to illustrate the present invention more conveniently. A relative refractive index difference is a value obtained by a ratio of a refractive index of each layer of an optical fiber to a refractive index of pure quartz glass minus one.

A core layer, the main light guiding layer of the optical fiber, is a middle part of the optical fiber with a relatively high refractive index. The core layer of the present invention comprises two parts, i.e., an inner core layer and an outer core layer. The outer core layer surrounds the inner core layer closely.

An inner cladding layer is a part of a cladding layer of the optical fiber closely surrounding the core layer, which is adjacent to a depressed cladding layer of the optical fiber.

The depressed cladding layer is a part of the cladding layer of the optical fiber with the lowest refractive index. The relative refractive index of the depressed cladding layer is lower than that of both the core layer and the cladding layer around it. The depressed cladding layer is generally obtained by doping fluorine (F) in a preform of the optical fiber through Plasma Chemical Vapor Deposition (PCVD) technology, or constituted by F-doped quartz tube.

An outer cladding layer is the outmost part of the glass structure of the optical fiber, which is adjacent to the plastic cladding layer of the optical fiber. According to the present invention, $r_1$ is a radius of the inner core layer, and its unit is micrometer (μm); $r_2$ is a radius of the outer core layer and also a radius of the whole core layer in the present invention, and its unit is micrometer (μm); $r_3$ is a radius of the inner cladding layer and also a radius of the whole area inside an inner wall of the depressed cladding layer, and its unit is micrometer (μm); $r_4$ is a radius of the depressed cladding layer and also a radius of the whole area inside an outer wall of the depressed cladding layer, and its unit is micrometer (μm); and $r_5$ is a radius of the outer cladding layer, i.e., a radius of the whole optical fiber, and its unit is micrometer (μm). According to the present invention, $\Delta_{12}$ is a refractive index difference of the inner core layer relative to the outer core layer; $\Delta_1$ is a refractive index difference of the inner core layer relative to pure quartz glass; $\Delta_2$ is a refractive index difference of the outer core layer relative to pure quartz glass; $\Delta_3$ is a refractive index difference of the inner cladding layer relative to pure quartz glass; $\Delta_4$ is a refractive index difference of the depressed cladding layer relative to pure quartz glass; and $\Delta_5$ is a refractive index difference of the outer cladding layer relative to pure quartz glass.

In order to eliminate the disadvantages of the optical fiber in the prior art as aforementioned, the present invention provides an optical fiber with a large effective area, whereby a relatively low attenuation and a good bending performance of the optical fiber can be ensured at the same time.

The present invention provides an optical fiber with a large effective area, comprising a core layer and a cladding layer, wherein said core layer comprises an inner core layer and an outer core layer; a radius $r_1$ of said inner core layer ranges from 1 μm to 4 μm, and a relative refractive index difference $\Delta_{12}$ of said inner core layer relative to said outer core layer is higher than or equal to −0.2% and less than 0%, said relative refractive index difference $\Delta_{12}$ being the same or increased as the radius of said inner core layer increases; a radius $r_2$ of said outer core layer ranges from 4 μm to 7 μm, and a relative refractive index difference $\Delta_2$ thereof ranges from −0.15% to 0.05%; said cladding layer comprises an inner cladding layer, a depressed cladding layer, and an outer cladding layer, said core layer being clad with said inner cladding layer; a radius $r_3$ of said inner cladding layer ranges from 7 μm to 20 μm, and a relative refractive index difference $\Delta_3$ thereof ranges from −0.5% to −0.1%; a radius $r_4$ of said depressed cladding layer ranges from 12 μm to 40 μm, and a relative refractive index difference $\Delta_4$ thereof ranges from −1.0% to −0.3%; and said outer cladding layer is the outermost layer, and a relative refractive index difference $\Delta_5$ thereof ranges from −0.4% to −0.2%.

According to the above technical solution, the relative refractive index difference $\Delta_{12}$ of said inner core layer relative to said outer core layer is higher than or equal to −0.1% and less than 0%.

According to the above technical solution, the relative refractive index difference $\Delta_2$ of said outer core layer ranges from −0.15% to −0.05%, and the radius $r_2$ thereof ranges from 5 μm to 7 μm.

According to the above technical solution, the relative refractive index difference $\Delta_3$ of said inner cladding layer ranges from −0.4% to −0.2%, and the radius $r_3$ thereof ranges from 10 μm to 20 μm.

According to the above technical solution, the relative refractive index difference $\Delta_3$ of said inner cladding layer ranges from −0.35% to −0.1%, and the radius $r_3$ thereof ranges from 7 μm to 15 μm.

According to the above technical solution, the relative refractive index difference $\Delta_4$ of said depressed cladding layer ranges from −0.6% to −0.3%, and the radius $r_4$ thereof ranges from 17 μm to 40 μm.

According to the above technical solution, the relative refractive index difference $\Delta_4$ of said depressed cladding layer ranges from −1.0% to −0.4%, and the radius $r_4$ thereof ranges from 10 μm to 20 μm.

According to the above technical solution, said outer cladding layer is high purity quartz glass doped with F, and a radius $r_5$ thereof is 62.5±0.5 μm.

According to the above technical solution, the core layer of the optical fiber is made of F-doped material or Ge—F co-doped material.

According to the above technical solution, an effective area of said optical fiber at a wavelength of 1550 nm ranges from 110 μm² to 150 μm², and an attenuation value thereof at a wavelength of 1550 nm is less than or equal to 0.180 dB/km.

According to the above technical solution, a cutoff wavelength of a cable made of said optical fiber is less than or equal to 1530 nm.

According to the above technical solution, at a wavelength of 1550 nm, an additional bending attenuation of one turn of said optical fiber with a bending radius of 10 mm is less than or equal to 0.7 dB; at a wavelength of 1625 nm, an additional bending attenuation of one turn of said optical fiber with a bending radius of 10 mm is less than or equal to 1.5 dB; and at a wavelength of 1625 nm, an additional bending attenuation of 100 turns of said optical fiber with a bending radius of 30 mm is less than or equal to 0.05 dB.

According to the above technical solution, an effective area of said optical fiber at a wavelength of 1550 nm ranges from 110 μm² to 140 μm², and an attenuation value thereof at a wavelength of 1550 nm is less than or equal to 0.175 dB/km.

The following beneficial effects can be brought about by the present invention. First, the relative refractive index of the core layer is close to the refractive index of pure quartz glass. Compared with SSMF, the loss brought about by Rayleigh scattering can be reduced sufficiently in the optical fiber of the present invention, so that the attenuation of the optical fiber can be reduced. In addition, the core layer is made of materials with relatively low refractive index, so that the optical power transmitted in the optical fiber can be distributed flatter. In this case, the effective area of the optical fiber can be improved while the size of the whole core layer is not changed. At the same time, the welding loss between this kind of optical fiber and SSMF can be reduced. Second, the core layer comprises the outer core layer and the inner core layer, wherein the outer core layer is maintained with a suitable relative refractive index difference, and the inner core layer is depressed appropriately. In this manner, a good attenuation performance and the same core layer diameter of the optical fiber can be maintained, the effective area thereof can be further increased, and the cutoff wavelength thereof can be reduced. Third, the optical fiber has a relatively thick depressed cladding layer, so that the effective area can be improved, and a good bending performance of the optical fiber can be maintained. In this case, the adverse effects on the bending performance of the optical fiber brought about by the increasing of the effective area can be eliminated. At the same time, the distribution range of the optical power is limited, and the optical power transmitted in the optical fiber can be concentrated in the core layer of the optical fiber, so that the attenuation of the optical fiber can be reduced. Last, the core layer is co-doped with F and Ge, so that the viscosity of the core layer can be reduced, the mismatching situation of the viscosity of the core layer and the cladding layer can be eliminated, and thus the attenuation of the optical fiber can be reduced.

The optical fiber of the present invention, with a larger effective area and a rather low transmission loss, is especially applicable for the communication systems of long distance, high speed, and large capacity, such as submarine cable communication system and long distance terrestrial transmission system. The optical fiber is compatible with G. 654 optical fiber and has quite good bending performance. Therefore, the optical fiber can be used in cabling and laying projects more conveniently.

DETAILED DESCRIPTION OF THE EMBODIMENTS

Figure 1:
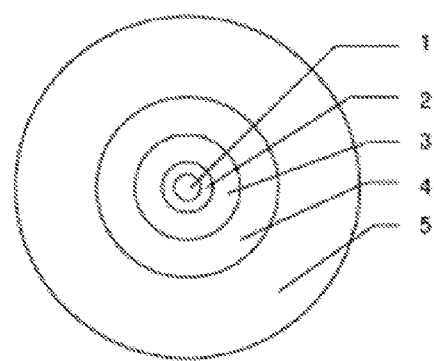
FIG. 1 schematically shows a radial sectional view of an optical fiber according to the present invention.
Figure 2:
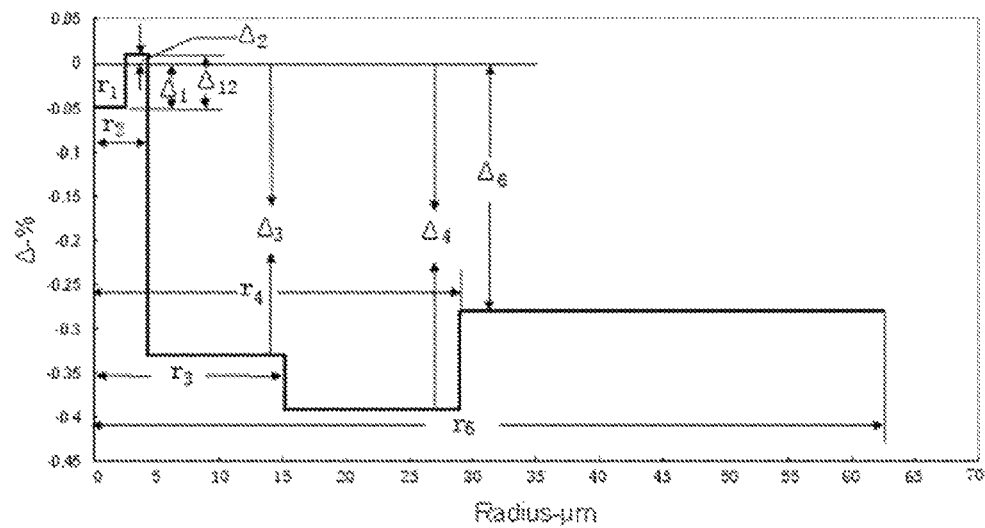
FIG. 2 schematically shows a sectional profile of refractive index of the optical fiber according to the present invention.
Figure 3:
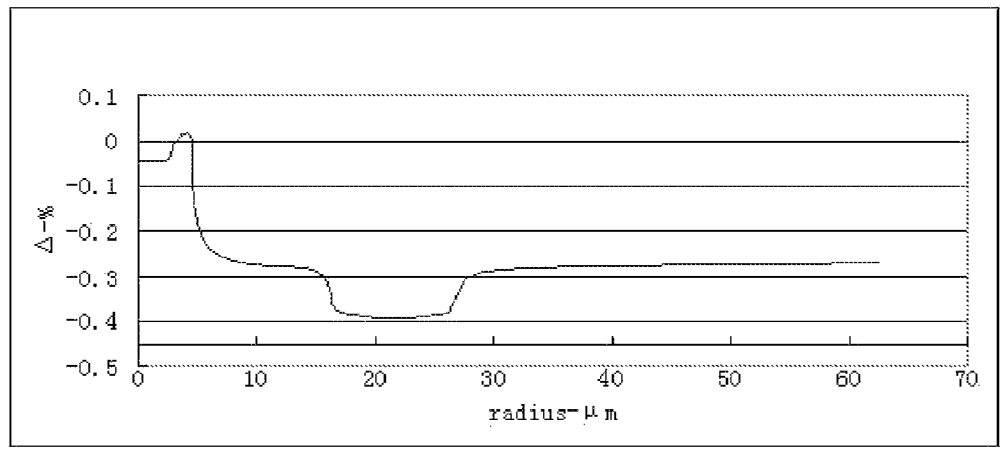
FIGS. 3 to 7 schematically show a sectional profile of refractive index of the optical fiber according to the embodiments of the present invention respectively.
Figure 4:
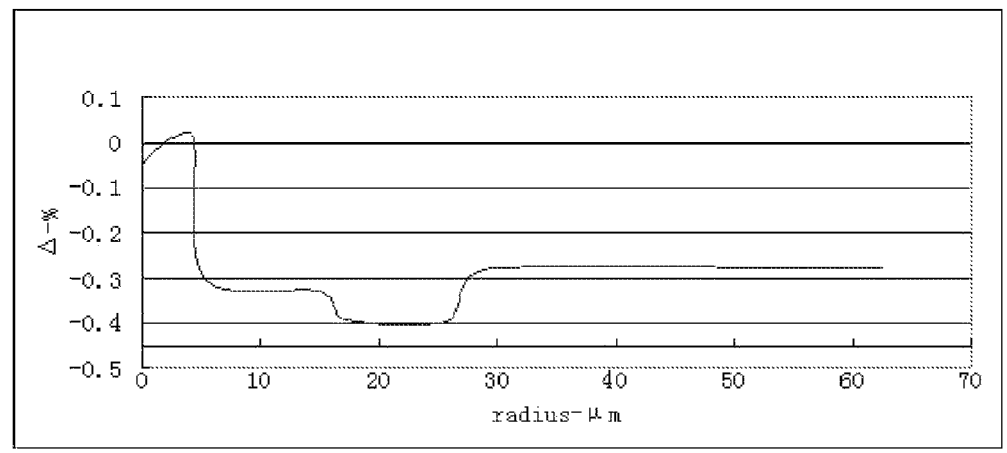
Figure 5:
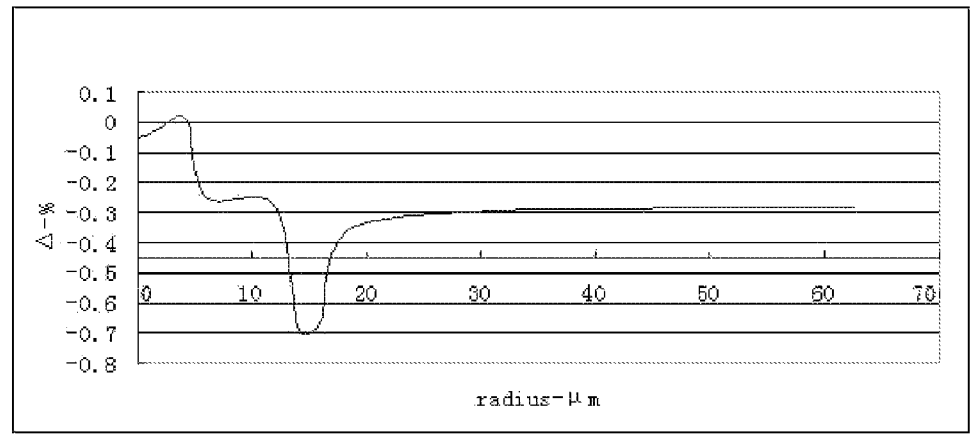
Figure 6:
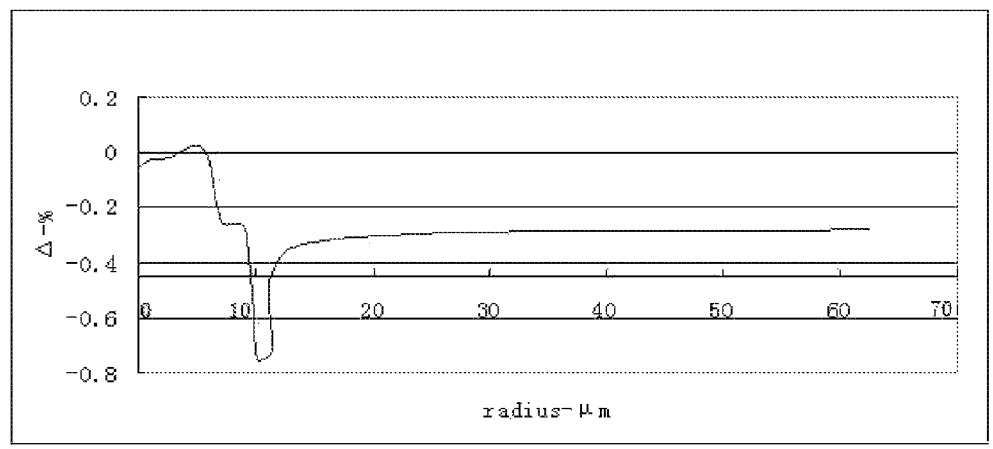
Figure 7:
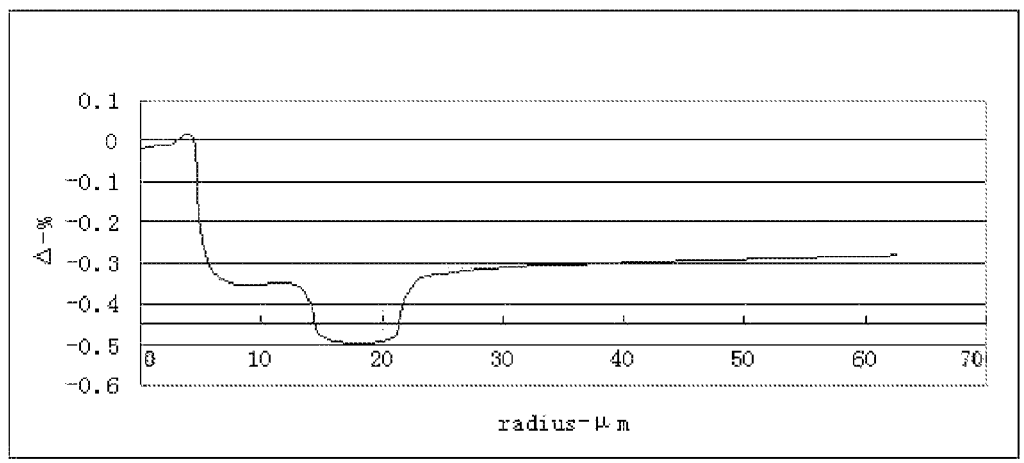

The present invention will be further illustrated hereinafter with reference to the embodiments. The optical fiber comprises a core layer and a cladding layer, wherein the core layer comprises an inner core layer 1 and an outer core layer 2. The outer core layer surrounds the inner core layer closely. A relative refractive index difference of the inner core layer is less than that of the outer core layer. The inner core layer and the outer core layer are formed by F-doped quartz glass or F—Ge co-doped quartz glass. A relative refractive index difference of the outer core layer is higher than that of the cladding layer. The cladding layer comprises an inner cladding layer 3, a depressed cladding layer 4, and an outer cladding layer 5, wherein a relative refractive index difference of the depressed cladding layer is less than both that of the inner cladding layer and that of the outer cladding layer.

According to the present invention, the optical parameters of the optical fiber are tested by an optical fiber analyzer PK2200. The additional losses of the optical fiber with different bending radii at a wavelength of 1550 nm and at a wavelength of 1625 nm are tested respectively. The attenuation of the optical fiber is measured by Optical Time Domain Reflectometer (OTDR), and the sectional profiles of refractive index of the optical fiber are tested by an optical fiber analyzer NR9200.

The structural parameters of the optical fiber manufactured according to the present invention are shown in Table 1.

TABLE 1

The structural parameters of the optical fiber

| serial number | The inner core layer | | The outer core layer | | The inner cladding layer | | The depressed cladding layer | | The outer cladding layer | |
|---|---|---|---|---|---|---|---|---|---|---|
| | Radius $r_1$ (μm) | Relative refractive index difference $\Delta_1$ (%) | Radius $r_2$ (μm) | Relative refractive index difference $\Delta_2$ (%) | Radius $r_3$ (μm) | Relative refractive index difference $\Delta_3$ (%) | Radius $r_4$ (μm) | Relative refractive index difference $\Delta_4$ (%) | Radius $r_5$ (μm) | Relative refractive index difference $\Delta_5$ (%) |
| 1 | 2.1 | −0.05 | 5.1 | 0.01 | 15.1 | −0.33 | 19.2 | −0.4 | 62.4 | −0.28 |
| 2 | 2.4 | −0.03 | 5.3 | 0.01 | 15.2 | −0.33 | 19.5 | −0.4 | 62.5 | −0.28 |
| 3 | 2.2 | −0.04 | 6.2 | −0.04 | 12.1 | −0.33 | 14.7 | −0.8 | 62.4 | −0.28 |
| 4 | 2.8 | −0.06 | 6.4 | −0.04 | 10.2 | −0.29 | 13.1 | −0.9 | 62.5 | −0.28 |
| 5 | 1.8 | −0.05 | 5.5 | 0.00 | 15.3 | −0.36 | 19.3 | −0.6 | 62.6 | −0.28 |
| 6 | 2.6 | −0.02 | 7.0 | −0.1 | 11.3 | −0.3 | 14.2 | −0.6 | 62.4 | −0.28 |
| 7 | 2.2 | −0.05 | 5.6 | −0.01 | 15.5 | −0.39 | 19.4 | −0.6 | 62.4 | −0.28 |
| 8 | 2.2 | −0.02 | 5.6 | 0.02 | 15.2 | −0.36 | 19.4 | −0.5 | 62.6 | −0.28 |
| 9 | 1.9 | −0.01 | 5.8 | 0.03 | 15.3 | −0.33 | 19.2 | −0.5 | 62.5 | −0.28 |
| 10 | 2.1 | −0.06 | 6.1 | −0.01 | 15.5 | −0.39 | 19.3 | −0.6 | 62.6 | −0.28 |

The main performance parameters of the optical fiber manufactured according to the present invention are shown in Table 2.

TABLE 2

The main performance parameters of the optical fiber

| serial number | The effective area @1550 nm (μm²) | The cutoff wavelength of the cable (nm) | The attenuation coefficient @1550 nm (dB/km) | The bending loss @1550 nm r = 10 mm (dB/turn) | The bending loss @1625 nm r = 10 mm (dB/turn) | The bending loss @1625 nm r = 30 mm (dB/100turn) |
|---|---|---|---|---|---|---|
| 1 | 112 | 1380 | 0.175 | 0.23 | 0.31 | 0.024 |
| 2 | 125 | 1380 | 0.176 | 0.23 | 0.41 | 0.017 |

TABLE 2-continued

The main performance parameters of the optical fiber

| serial number | The effective area @1550 nm ($\mu m^2$) | The cutoff wavelength of the cable (nm) | The attenuation coefficient @1550 nm (dB/km) | The bending loss @1550 nm r = 10 mm (dB/turn) | The bending loss @1625 nm r = 10 mm (dB/turn) | The bending loss @1625 nm r = 30 mm (dB/100turn) |
|---|---|---|---|---|---|---|
| 3 | 138 | 1390 | 0.173 | 0.36 | 0.55 | 0.031 |
| 4 | 143 | 1410 | 0.176 | 0.27 | 0.42 | 0.015 |
| 5 | 134 | 1425 | 0.175 | 0.31 | 0.47 | 0.022 |
| 6 | 155 | 1525 | 0.175 | 0.44 | 0.65 | 0.027 |
| 7 | 134 | 1475 | 0.174 | 0.27 | 0.35 | 0.024 |
| 8 | 137 | 1470 | 0.173 | 0.32 | 0.63 | 0.034 |
| 9 | 138 | 1520 | 0.175 | 0.49 | 0.76 | 0.032 |
| 10 | 142 | 1510 | 0.173 | 0.43 | 0.56 | 0.038 |

It can be seen from the above embodiments that, the optical parameters of the optical fiber according to the present invention, such as mode field diameter, cutoff wavelength, and fiber loss, can completely meet the requirements of the G. 654 standard formulated by ITU-T, and the bending performance thereof is superior to the requirement of the G. 654 standard. On this basis, the effective area of the optical fiber can reach 120 $\mu m^2$ or more. According to the present invention, the two important performance indexes of the optical fiber, i.e., the effective area and the bending loss, can be optimized as much as possible, which has a great significance in long distance, large capacity, and high speed transmission. The optical fiber has excellent bending performance also, whereby not only the laying cost of the optical fiber communication system can be saved, but also the adverse effects on the performance of the communication system brought about in the laying procedures can be reduced. Therefore, the optical fiber has an important application value.

What is claimed is:

1. An optical fiber with a large effective area, comprising a core layer and a cladding layer, wherein
said core layer comprises an inner core layer and an outer core layer;
a radius $r_1$ of said inner core layer ranges from 1 $\mu m$ to 4 $\mu m$, and a relative refractive index difference $\Delta_{12}$ of said inner core layer relative to said outer core layer is higher than or equal to −0.2% and less than 0%, said relative refractive index difference $\Delta_{12}$ being the same or increased as the radius of said inner core layer increases; and
a radius $r_2$ of said outer core layer ranges from 4 $\mu m$ to 7 $\mu m$, and a relative refractive index difference $\Delta_2$ thereof ranges from −0.15% to 0.05%; and
said cladding layer comprises an inner cladding layer, a depressed cladding layer, and an outer cladding layer, said core layer being clad with said inner cladding layer;
a radius $r_3$ of said inner cladding layer ranges from 7 $\mu m$ to 20 $\mu m$, and a relative refractive index difference $\Delta_3$ thereof ranges from −0.5% to −0.1%;
a radius $r_4$ of said depressed cladding layer ranges from 12 $\mu m$ to 40 $\mu m$, and a relative refractive index difference $\Delta_4$ thereof ranges from −1.0% to −0.3%; and
said outer cladding layer is the outermost layer, and a relative refractive index difference $\Delta_5$ thereof ranges from −0.4% to −0.2%.

2. The optical fiber according to claim 1, wherein the relative refractive index difference $\Delta_{12}$ of said inner core layer relative to said outer core layer is higher than or equal to −0.1% and less than 0%.

3. The optical fiber according to claim 1, wherein the relative refractive index difference $\Delta_2$ of said outer core layer ranges from −0.15% to −0.05%, and the radius $r_2$ thereof ranges from 5 $\mu m$ to 7 $\mu m$.

4. The optical fiber according to claim 1, wherein the relative refractive index difference $\Delta_3$ of said inner cladding layer ranges from −0.4% to −0.2%, and the radius $r_3$ thereof ranges from 10 $\mu m$ to 20 $\mu m$.

5. The optical fiber according to claim 1, wherein the relative refractive index difference $\Delta_3$ of said inner cladding layer ranges from −0.35% to −0.1%, and the radius $r_3$ thereof ranges from 7 $\mu m$ to 15 $\mu m$.

6. The optical fiber according to claim 1, wherein the relative refractive index difference $\Delta_4$ of said depressed cladding layer ranges from −0.6% to −0.3%, and the radius $r_4$ thereof ranges from 17 $\mu m$ to 40 $\mu m$.

7. The optical fiber according to claim 1, wherein the relative refractive index difference $\Delta_4$ of said depressed cladding layer ranges from −1.0% to −0.4%, and the radius $r_4$ thereof ranges from 10 $\mu m$ to 20 $\mu m$.

8. The optical fiber according to claim 1, wherein said outer cladding layer is high purity quartz glass doped with fluorine, and a radius $r_5$ thereof is 62.5±0.5 $\mu m$.

9. The optical fiber according to claim 1, wherein an effective area of said optical fiber at a wavelength of 1550 nm ranges from 110 $\mu m^2$ to 150 $\mu m^2$, and an attenuation value thereof at a wavelength of 1550 nm is less than or equal to 0.180 dB/km.

10. The optical fiber according to claim 1, wherein at a wavelength of 1550 nm, an additional bending attenuation of one turn of said optical fiber with a bending radius of 10 mm is less than or equal to 0.7 dB; at a wavelength of 1625 nm, an additional bending attenuation of one turn of said optical fiber with a bending radius of 10 mm is less than or equal to 1.5 dB; and at a wavelength of 1625 nm, an additional bending attenuation of 100 turns of said optical fiber with a bending radius of 30 mm is less than or equal to 0.05 dB.

11. The optical fiber according to claim 2, wherein the relative refractive index difference $\Delta_2$ of said outer core layer ranges from −0.15% to −0.05%, and the radius $r_2$ thereof ranges from 5 $\mu m$ to 7 $\mu m$.

12. The optical fiber according to claim 2, wherein the relative refractive index difference $\Delta_3$ of said inner cladding layer ranges from −0.4% to −0.2%, and the radius $r_3$ thereof ranges from 10 $\mu m$ to 20 $\mu m$.

13. The optical fiber according to claim 2, wherein the relative refractive index difference $\Delta_3$ of said inner cladding layer ranges from −0.35% to −0.1%, and the radius $r_3$ thereof ranges from 7 $\mu m$ to 15 $\mu m$.

14. The optical fiber according to claim 2, wherein the relative refractive index difference $\Delta_4$ of said depressed cladding layer ranges from −0.6% to −0.3%, and the radius $r_4$ thereof ranges from 17 μm to 40 μm.

15. The optical fiber according to claim 2, wherein the relative refractive index difference $\Delta_4$ of said depressed cladding layer ranges from −1.0% to −0.4%, and the radius $r_4$ thereof ranges from 10 μm to 20 μm.

16. The optical fiber according to claim 2, wherein said outer cladding layer is high purity quartz glass doped with fluorine, and a radius $r_5$ thereof is 62.5±0.5 μm.

17. The optical fiber according to claim 2, wherein an effective area of said optical fiber at a wavelength of 1550 nm ranges from 110 μm² to 150 μ², and an attenuation value thereof at a wavelength of 1550 nm is less than or equal to 0.180 dB/km.

18. The optical fiber according to claim 2, wherein at a wavelength of 1550 nm, an additional bending attenuation of one turn of said optical fiber with a bending radius of 10 mm is less than or equal to 0.7 dB; at a wavelength of 1625 nm, an additional bending attenuation of one turn of said optical fiber with a bending radius of 10 mm is less than or equal to 1.5 dB; and at a wavelength of 1625 nm, an additional bending attenuation of 100 turns of said optical fiber with a bending radius of 30 mm is less than or equal to 0.05 dB.

\* \* \* \* \*